US008527261B2

(12) United States Patent
Shibutani

(10) Patent No.: US 8,527,261 B2
(45) Date of Patent: *Sep. 3, 2013

(54) PORTABLE ELECTRONIC APPARATUS CAPABLE OF MULTILINGUAL DISPLAY

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 682 days.

This patent is subject to a terminal disclaimer.

(21) Appl. No.: 11/689,921

(22) Filed: Mar. 22, 2007

(65) Prior Publication Data

US 2007/0179773 A1 Aug. 2, 2007

Related U.S. Application Data

(62) Division of application No. 10/648,858, filed on Aug. 25, 2003, now Pat. No. 7,280,138.

(30) Foreign Application Priority Data

Aug. 28, 2002 (JP) ................................ 2002-248845

(51) Int. Cl.
*G06F 17/20* (2006.01)

(52) U.S. Cl.
USPC ............................................. 704/8; 348/239

(58) Field of Classification Search
USPC ......................................... 704/1–9; 348/239
See application file for complete search history.

(56) References Cited

U.S. PATENT DOCUMENTS

| 5,127,748 A * | 7/1992 | Okimoto et al. ................. 400/70 |
| 5,157,606 A * | 10/1992 | Nagashima ........................ 704/2 |
| 5,440,615 A * | 8/1995 | Caccuro et al. ............. 379/88.06 |
| 5,570,134 A * | 10/1996 | Hong ............................. 348/467 |
| 5,652,824 A * | 7/1997 | Hirayama et al. ............... 386/95 |
| 5,917,484 A * | 6/1999 | Mullaney ....................... 715/703 |

(Continued)

FOREIGN PATENT DOCUMENTS

| CN | 1099498 A | 11/1994 |
| CN | 1120771 A | 5/1995 |

(Continued)

OTHER PUBLICATIONS

Japanese Office Action dated Mar. 17, 2009 (2 pages), and English translation thereof (3 pages), issued in counterpart Japanese Application Serial No. 2002-248845.

(Continued)

*Primary Examiner* — Jialong He
(74) *Attorney, Agent, or Firm* — Holtz, Holtz, Goodman & Chick, PC

(57) ABSTRACT

In a portable electronic apparatus, a memory is provided to store a plurality of groups of messages. Each group of messages includes messages having the same meaning, which are expressed in different languages such as Japanese, English, and French. A user designates a main language corresponding to a mother tongue of the user and a sub-language corresponding to a language used in a travel destination area. When a travel mode is set, for instance, a photograph request button is depressed and a photograph requesting message is, for example, displayed in the main language and in the sub-language on a display screen simultaneously. As a result, a user who is very weak in English can show the request messages to a third party to easily request the third party to the user, while at the same time the user can confirm the contents of the request messages.

3 Claims, 14 Drawing Sheets

(56) References Cited

U.S. PATENT DOCUMENTS

| | | | |
|---|---|---|---|
| 6,111,572 A * | 8/2000 | Blair et al. | 715/703 |
| 6,160,964 A * | 12/2000 | Imoto | 396/300 |
| 6,169,854 B1 | 1/2001 | Hasegawa et al. | |
| 6,223,190 B1 | 4/2001 | Aihara et al. | |
| 6,266,642 B1 * | 7/2001 | Franz et al. | 704/277 |
| 6,370,498 B1 * | 4/2002 | Flores et al. | 704/3 |
| 6,477,239 B1 | 11/2002 | Ohki et al. | |
| 6,546,084 B1 * | 4/2003 | Castagna | 379/88.12 |
| 6,559,866 B2 | 5/2003 | Kolde et al. | |
| 6,661,466 B1 | 12/2003 | Kou | |
| 6,734,798 B2 | 5/2004 | Smith | |
| 6,784,924 B2 | 8/2004 | Ward et al. | |
| 7,948,832 B1 * | 5/2011 | Luo et al. | 368/21 |
| 2001/0045986 A1 | 11/2001 | Edwards | |
| 2002/0078459 A1 | 6/2002 | McKay | |
| 2002/0085111 A1 | 7/2002 | Heiman | |
| 2002/0105582 A1 | 8/2002 | Ikeda | |
| 2002/0116172 A1 * | 8/2002 | Vargas | 704/8 |
| 2003/0035075 A1 | 2/2003 | Butler et al. | |
| 2003/0133041 A1 * | 7/2003 | Curtis et al. | 348/462 |
| 2006/0029290 A1 | 2/2006 | Edwards | |

FOREIGN PATENT DOCUMENTS

| | | |
|---|---|---|
| JP | 06-303522 A | 10/1994 |
| JP | 09-105998 A | 4/1997 |
| JP | 11-024153 A | 1/1999 |
| JP | 11-184892 A | 7/1999 |
| JP | 2000-023012 A | 1/2000 |
| WO | WO 99/53685 A1 | 10/1999 |
| WO | WO 01/67205 A2 | 9/2001 |

OTHER PUBLICATIONS

Japanese Office Action (and English translation thereof) dated Nov. 11, 2008, issued in a counterpart Japanese Application.

* cited by examiner

| TIME DIFFERENCE | PROPOSED LANGUAGE |
|---|---|
| -12:00 | ···,ENGLISH |
| ≀ | ≀ |
| 00:00 | ···,ENGLISH |
| +01:00 | DUTCH,GERMAN,SWEDISH ···,ENGLISH |
| +02:00 | ···,ENGLISH |
| ≀ | ≀ |
| +08:00 | ···,ENGLISH |
| +09:00 | JAPANESE,KOREAN, ···,ENGLISH |
| +10:00 | ···,ENGLISH |
| +11:00 | ···,ENGLISH |
| +12:00 | ···,ENGLISH |

| NUMBER | JAPANESE | ENGLISH | GERMAN | KOREAN | FRENCH | ITALIAN | CHINESE |
|---|---|---|---|---|---|---|---|
| 1 | ありがとうございました | THANK YOU VERY MUCH | VIELEN DANK! | 감사합니다 | MERCI BEAUCOUP | GRAZIE MILLE | 謝謝 |
| 2 | | | | | | | |
| 3 | | | | | | | |
| 4 | | | | | | | |
| 5 | | | | | | | |
| | | | | | | | |
| | | | | | | | |
| | | | | | | | |
| | | | | | | | |
| n | | | | | | | |

Fig.8
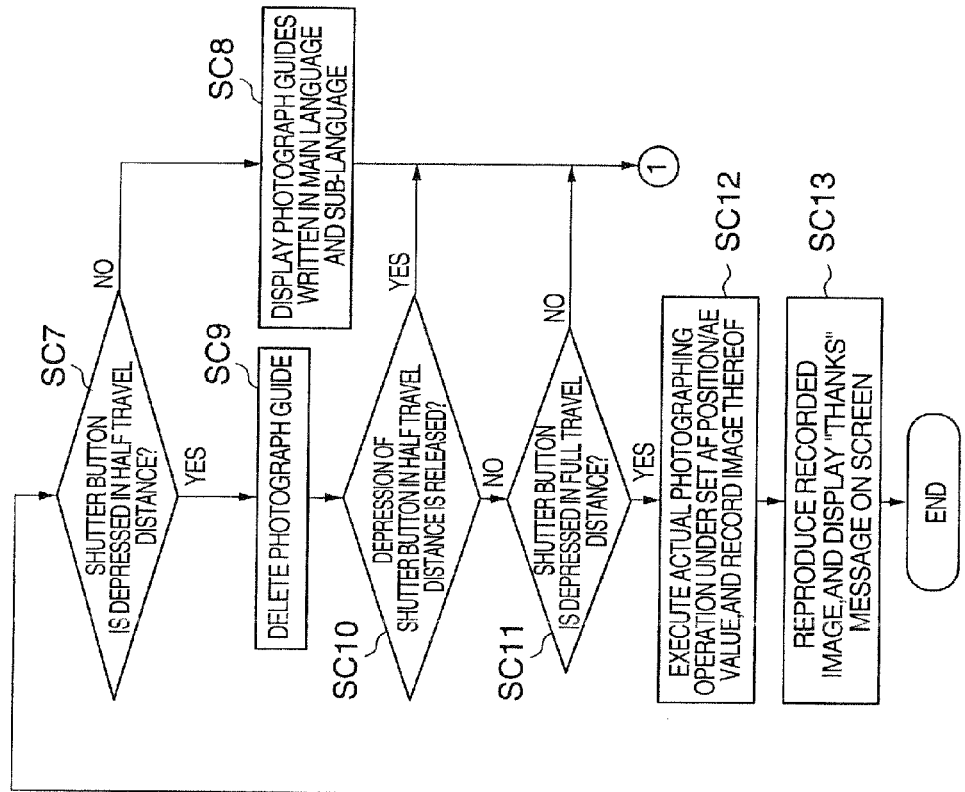
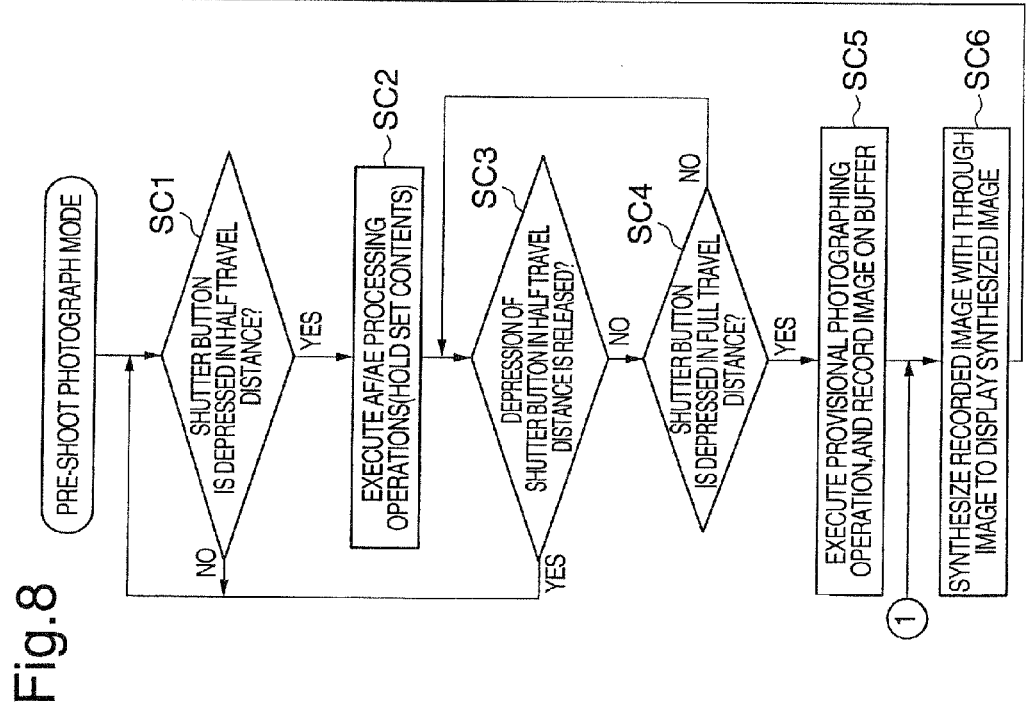

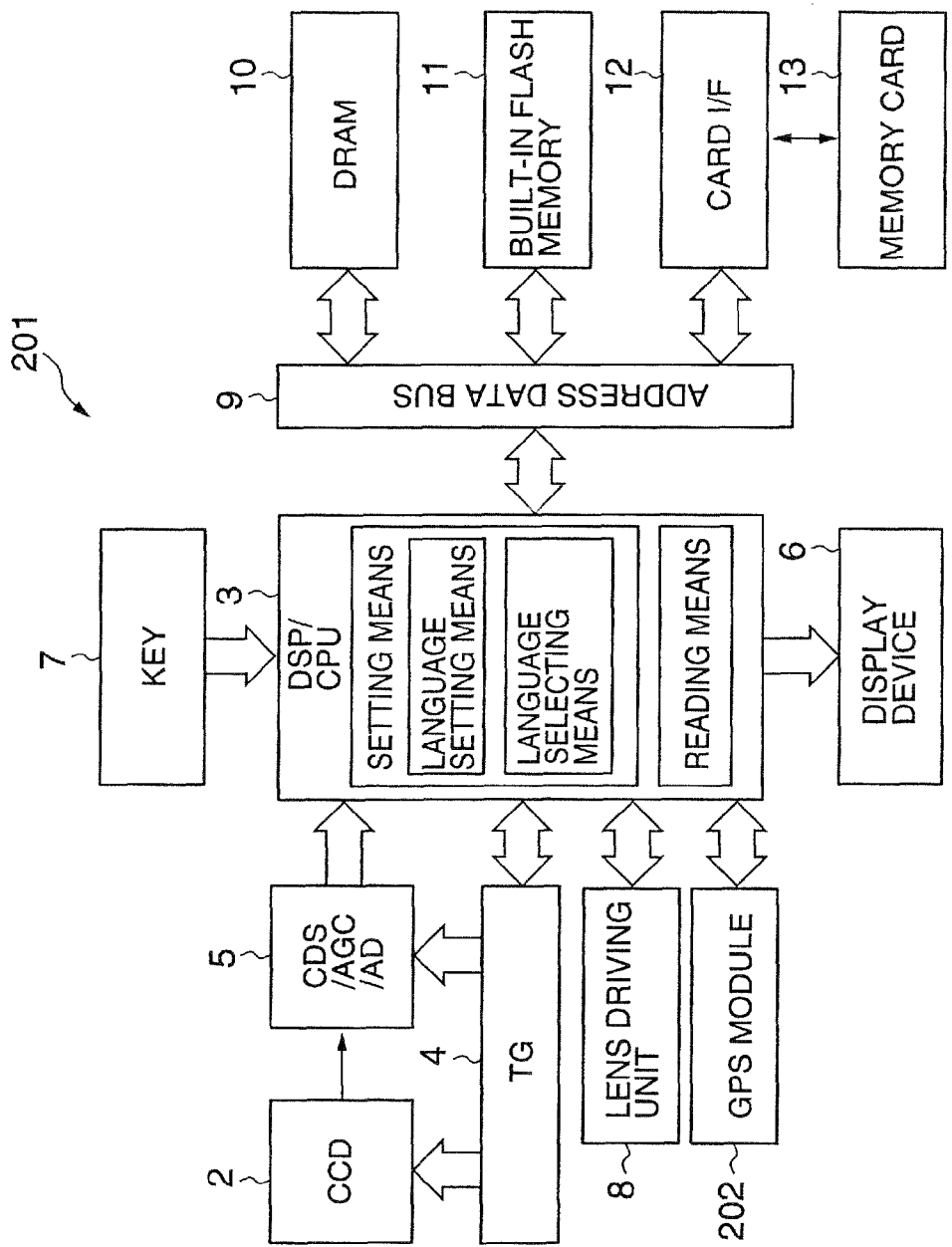

PORTABLE ELECTRONIC APPARATUS CAPABLE OF MULTILINGUAL DISPLAY

CROSS-REFERENCE TO RELATED APPLICATION

The present application is a Divisional Application of U.S. application Ser. No. 10/648,858 filed Aug. 25, 2003, now U.S. Pat. No. 7,280,138, which is incorporated herein by reference.

BACKGROUND OF THE INVENTION

1. Field of the Invention

The present invention generally relates to a camera apparatus equipped with a function capable of outputting messages, and to a message outputting method. More specifically, the present invention is directed to such a camera apparatus capable of displaying multilingual messages in a foreign travel mode, and also to a multilingual message outputting method.

2. Description of the Related Art

Conventionally, in electronic appliances equipped with display devices, while plural sorts of indication (representation) data made of different languages are prepared as indication data such as operation buttons displayed on operation screens of these display devices, any one of these indication data may be selected to be used as desirable indication data in response to selecting operations by users. In these conventional electronic appliances, these users may select desirable indications form, for instance, both Japanese indications ("KAISHI" and "SETTEI" expressed in Japanese) and English indications ("START" and "SET" expressed in English) to be displayed on the operation screen. On the other hand, cameras equipped with translation functions have been proposed. In such cameras, for example, when an English indication of "DANGER" is contained in a photographed image, this indication is character-recognized so as to be translated into a Japanese indication of "KIKEN", and thus, this translated Japanese indication "KIKEN" is displayed on display units of the cameras equipped with the translation function.

However, even when the above-described conventional technical ideas would be employed in camera apparatus known as digital still cameras, for example, if users want to request a third party in an over sea travel place to take some pictures where the own users are photographed by using such digital cameras, then these users should request the third party to take these pictures on behalf of these users in a vocal manner. That is, the above-described digital cameras are equipped with CCD devices, while images of photographic subjects are photographed by a CCD and the like and these images are recorded as image data on various sorts of recording media, and furthermore, indications such as operation buttons displayed on operation screens could be expressed by using a plurality of languages. However, even when the users depart for foreign countries with using such digital cameras, these users must request any persons in the foreign countries to photograph pictures where the own users appear by these persons in the vocal manner. Furthermore, since various sorts of photograph modes have been prepared in recent digital cameras, the users of these digital cameras can hardly explain photographing methods adapted to the various photograph modes.

SUMMARY OF THE INVENTION

The present invention has been made to solve the above-explained difficulties, and therefore, has an object to provide such a camera apparatus having a user friendly function, for instance, a digital still camera usefully available in a foreign travel mode to a user.

To achieve the above-described object, a camera apparatus, according to an aspect of the present invention, is featured by such a camera apparatus capable of displaying a character, comprising:

a photographing unit for photographing a subject for photography;

an image storage unit for storing therein to an image photographed by the photographing unit;

a messages to rage unit for storing there into a plurality of messages having the same meanings, which are expressed in a first language and a second language different from the first language;

a language setting unit for setting the first language and the second language in response to a request made by a user;

a message reading unit for reading both the message of the first language and the message of the second language which corresponds to the first language message and has been set by the language setting unit from the message storage unit;

a message output unit for outputting the second language message read by the message reading unit in combination with the first language message corresponding thereto;

Also, a message outputting method, according to another aspect of the present invention, is featured by such a message outputting method used in a camera apparatus, comprising:

a second language setting step for setting a sort of a second language in response to a request of a user;

a selecting step for selecting a message written in a first language;

an extracting step for extracting both a preset message written in the first language and the message written in the second language, which has been set in the second language setting step, from a plurality of messages which have the same meanings and are expressed by different languages; and an outputting step for outputting both the first language message and the second language message.

A computer-readable program, according to another aspect of the present invention, is featured by such a program executed by a control unit employed in a camera apparatus for storing therein to a plurality of messages which own the same meanings and are expressed by both a first language and a second language different from the first language, in which the program is comprised of:

a processing operation for setting the second language in response to a request of a user;

a processing operation for selecting a message written in the first language;

a processing operation for extracting both a preset message written in the first language and the message written in the second language, which has been set in the second language setting process operation, from a plurality of messages which have the same meanings and are expressed by different languages; and a processing operation for outputting both the first language message and the second language message.

Furthermore, a portable electronic apparatus, according to a further aspect of the present invention, is featured by such a portable electronic apparatus capable of displaying a multilingual expression, comprising:

a storage unit for storing therein to a plurality of operation information as to the portable electronic apparatus, which have the same meanings expressed by both a first language and a second language different from the first language;

a setting unit for setting both the first language and the second language in response to a request of a user;

a key inputting unit for designating desirable operation information;

a reading unit for reading both operation information written in the first language and operation information written in the second language, which has been set by the setting unit and corresponds to the first language operation information, from the storage unit; and a display unit for displaying thereon the second language operation information read out from the storage unit by the reading unit in combination with the first language operation information corresponding thereto at the same time.

BRIEF DESCRIPTION OF THE DRAWINGS

For a better understanding of the present invention, reference is made of a detailed description to be read in conjunction with the accompanying drawings, in which:

FIG. 2A schematically shows a proposed language setting table constituted by storage data of a flash memory built in the first digital camera of FIG. 2;

FIG. 2B is a schematic diagram for indicating a content of a document table employed in the first digital camera;

FIG. 8 is a flow chart for explaining photographing process operations of the first digital camera executed in a preshoot mode;

FIG. 12 is a schematic block diagram for showing an arrangement of a digital camera according to a second embodiment of the present invention;

DETAILED DESCRIPTION OF THE PREFERRED EMBODIMENTS

Referring now to drawings, various preferred embodiments of the present invention will be described in detail.

Arrangement of First Degital Camera

Figure 1:
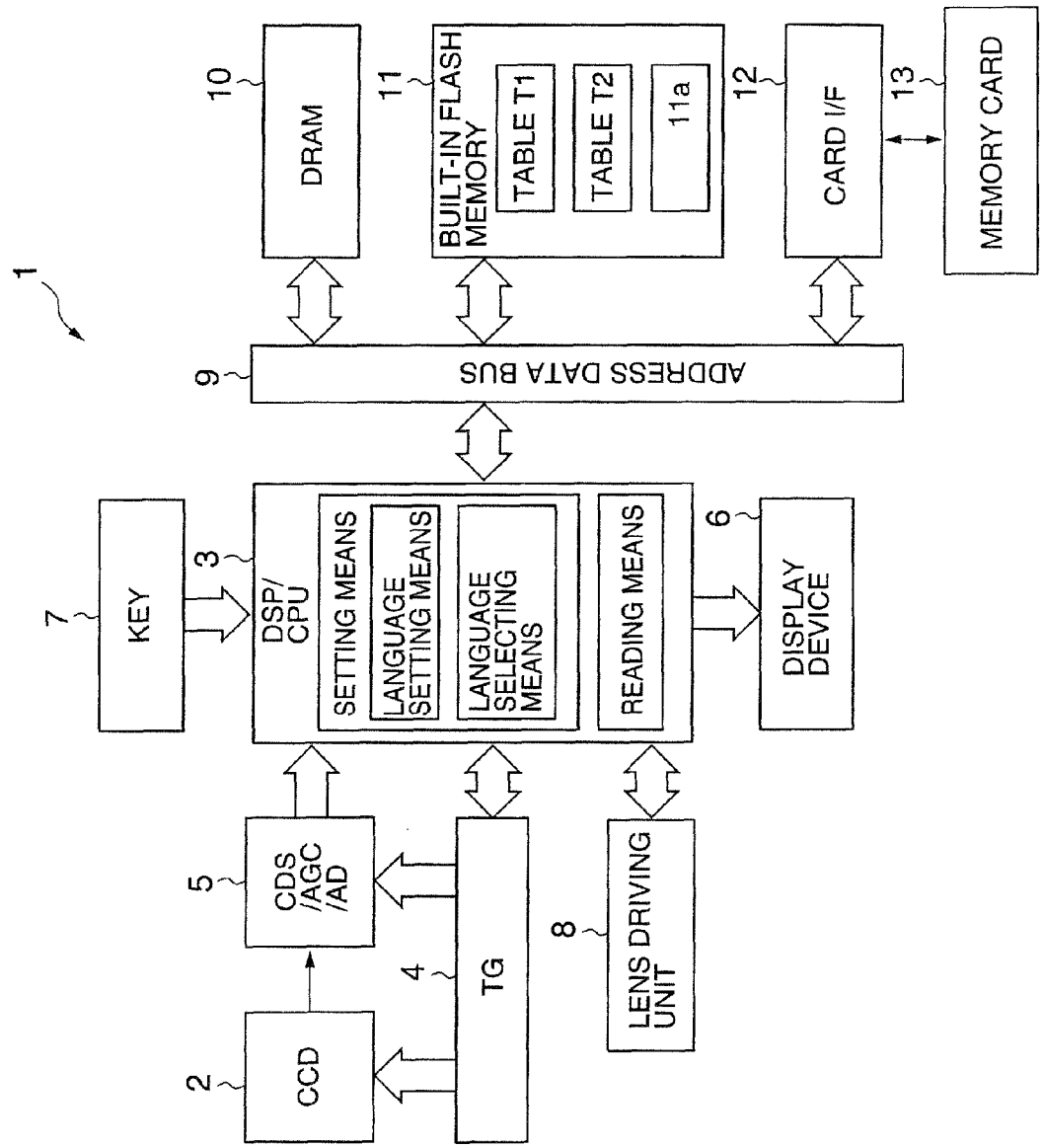
FIG. 1 is a schematic block diagram for indicating an arrangement of a digital camera according to a first embodiment of the present invention.

FIG. 1 schematically shows a block diagram of an electronic arrangement of a digital camera 1 corresponding to a photographing apparatus according to a first embodiment of the present invention. This first digital camera 1 is equipped with a general-purpose function such as an AF (auto-focusing) function and an AE (auto-exposing) function, and contains a CCD (charge-coupled device) 2 functioning as a photographing means, and a DSP/CPU (digital signal processing/central processing unit) 3. The CCD 2 photoelectrically converts a photographed optical image of a subject for photography, which is focused via a focusing lens (not shown) and a zoom lens (not shown either), and then outputs an analog imaging signal in correspondence with this optical image of the subject for photography. The DSP/CPU 3 corresponds to an one-chip microcomputer having various sorts of digital signal processing functions which contain a compressing/expanding function of image data by way of the JPEG (Joint Photographic Experts Group) system. Also, this DSP/CPU 3 controls various units of this first digital camera 1.

A TG (timing generator) 4 for driving the CCD 2 is connected to the DSP/CPU 3, and a unit circuit 5 into which an analog imaging signal outputted from the CCD 2 is entered is connected to the TG 4. This unit circuit 5 is constituted by a CDS circuit, a gain control amplifier (AGG), and an A/D converter (A/D). The CDS circuit performs correlative-dual sampling operation with respect to the analog image signal derived from the CCD 2 to hold the sampled imaging signal. The gain control amplifier amplifies the sampled imaging signal. Then, the A/D converter converts the amplified analog image signal into a digital imaging signal. Thus, the analog imaging signal outputted from the CCD 2 is processed in this unit circuit 5 and then is supplied as a digital imaging signal to the DSP/CPU 3.

Also, a display device 6, a key input unit 7, and a lens driving unit 8 are connected to the DSP/CPU 3. Further, a DRAM (dynamic random access memory) 10, a built-in flash memory 11, and a card interface 12 are connected via an address data bus 9 to this DSP/CPU 3. Also, a memory card 13 is connected to this card interface 12, while the memory card 13 is detachably mounted on a card slot (not shown) of a main body of this first digital camera 1.

The lens driving unit 8 is constituted by stepper motors and a motor driver. The stepper motors drive both the focusing lens and the zoom lens along optical axis directions respectively. The motor driver drives these stepper motors in response to control signals sent from the DSP/CPU 3. The DRAM 10 may function as a buffer, and may be used as a working memory of the DSP/CPU 3. This buffer temporarily stores therein to image data of a subject for photography which has been photographed by the CCD 2 when a photograph waiting mode is set, and has been digitally processed. The image data temporarily stored in the DRAM 10 is compressed, and finally, the compressed image data is stored into the memory card 13 (namely, image recording means).

The display device 6 corresponds to an output means (namely, display means) of the present invention, and contains both a color CCD and a drive circuit for driving this color CCD. This display device 6 displays thereon an image of a photographic subject as a "through image", which has been photographed by the CCD 2 in the photograph waiting mode. Also, the display device 6 displays thereon a recorded image which has been read out from the memory card 13 to be expanded in a reproduction mode. The key input unit 7 contains a plurality of operation keys such as a shutter key, a power supply key, a mode selection key, a cross-shaped key, and the like. The key input unit 7 outputs a key input signal in response to a key operation made by a user to the DSP/CPU 3.

The built-in flash memory 11 has previously stored therein to a control program and various sorts of data. This control program is executed so as to cause the DSP/CPU 3 to control the various units of the digital camera 1. The various sorts of data are used while the DSP/CPU 3 is operated. Since the DSP/CPU3 is operated in accordance with the above-explained control program, this DSP/CPU 3 executes the control operations such as the above-explained AF and AE operations, and furthermore, may function as a setting means (language setting means and language selecting means), and a reading means of the present invention. Also, the built-in flash memory 11 corresponds to a storage means of the present invention, and has previously stored thereto such data which constitute both a proposed language setting table "T1" shown in FIG. 2A and a document table "T2" indicated in FIG. 2B.

The proposed language setting table "T1" corresponds to such a table which represents a correspondence relationship between "time differences" and "proposed languages." A "time difference" indicates a temporal difference which is used in the same time-zone regions on the earth with respect to the Greenwich mean time in the standard time. A "proposed language" is used in such a region (country, regional area) where time differences thereof are substantially equal to each other, and is constituted by either one language or plural languages (Japanese, English etc.). It should be noted that all of the respective proposed languages contain "English" irrespective of time differences corresponding to these proposed languages. It should also be noted that the above-explained "proposed languages" need not cover all of the languages used all over the world, for example, may cover languages which may be probably used in destination regions of travels, and/or may cover only official languages used in the respective countries and/or the respective regions.

The document table "T2" corresponds to such a table which indicates character strings of expressions. These expressions are made by a plurality of messages having implication contents different from each other to which serial numbers (1, 2, 3, - - -, n) have been applied; and also by the above-explained proposed languages (Japanese, English, German, - - - ,) which correspond to the messages of the respective serial numbers. In the example of this document table "T2", a character string of a Japanese expression with respect to the message numbered by "1" corresponds to "ARIGATO", and another character string of an English expression corresponds to "Thank you" (other expressions are omitted). These character data have been previously stored in the built-in flash memory 11. Also, in accordance with implication contents thereof, the messages of the respective numbers are mainly classified into messages (first classification) for users and messages (second classification) which are used to be proposed by these users with respect to other persons (third party). In this embodiment, as the messages with respect to the users, for example, various sorts of messages have been previously prepared, which are normally displayed when the users perform the mode setting operations. Also, as the messages which are proposed by the users with respect to other persons, the below-mentioned messages have been previously prepared, namely, request messages for requesting photographing operations, photograph guides displayed in pre-shoot modes, and thanks messages have been previously prepared.

Figure 3:
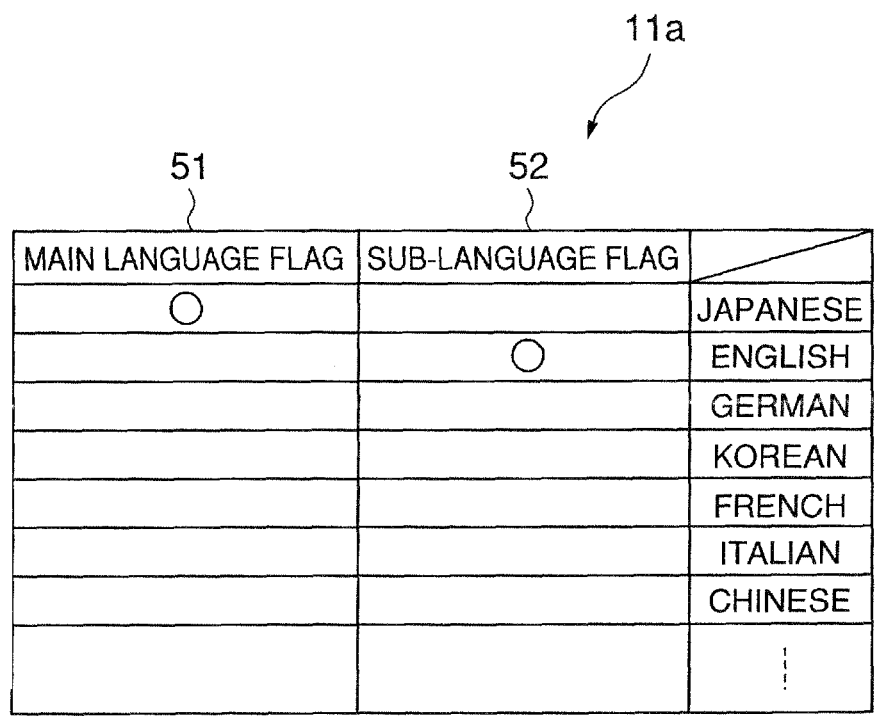
FIG. 3 is a schematic diagram for representing a language selecting flag storage area secured in the built-in type flash memory of FIG. 1.

In the built-in flash memory 11, a language selecting flag storage area 11a as shown in FIG. 3 is secured. This language selecting flag storage area 11a stores therein to flag data which are made of a main language flag 51 and a sub-language flag 52. Both the main language flag 51 and the sub-language flag 52 indicate that both a main language and a sub-language (will be discussed later) correspond to any of such languages which have been stored as the proposed languages in the above-described proposed language setting table "T1".

Next, a description will now be made of various featured operations related to the above-explained first digital camera 1 with employment of the above-described arrangement.

Camera Operation in Language Environment Setting Mode

Figure 4:
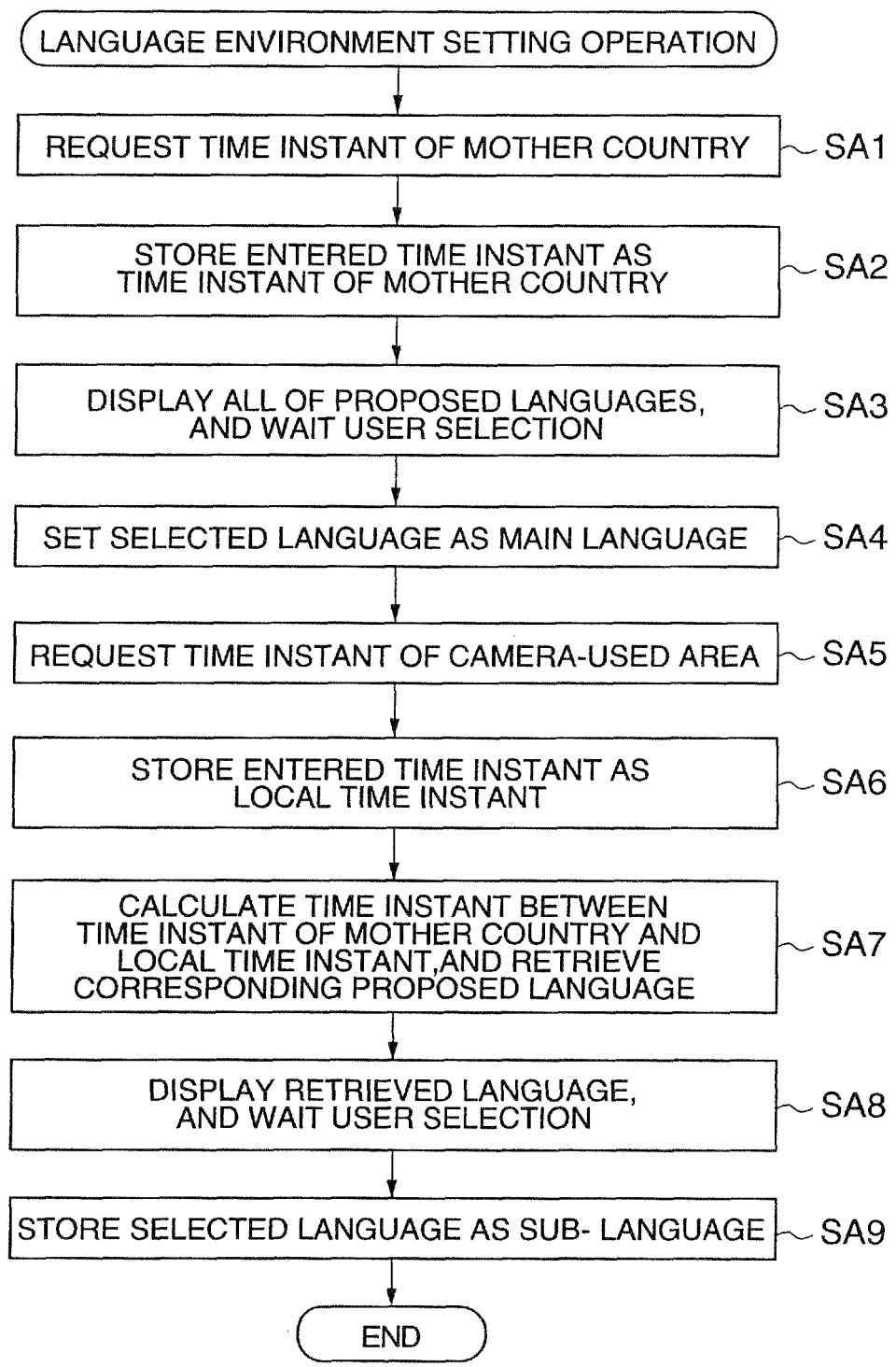
FIG. 4 is a flow chart for describing sequential operations of the first digital camera executed in a language environment setting mode.
Figure 5:
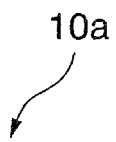
FIG. 5 is a schematic diagram for indicating data which are temporarily stored in a work area of a DRAM shown in FIG. 1 in the language environment setting mode.

FIG. 4 is a flow chart for describing sequential operations of the first digital camera 1 when a language environment setting mode which have been previously prepared in the built-in flash memory 11 of this digital camera 1 is selected by the user. The language environment setting mode corresponds to such a mode which is used so as to set various sorts of data required in a foreign travel mode (will be explained later). When this language environment setting mode is set, the DSP/CPU 3 employed in the first digital camera 1 firstly requests, or prompts the user to enter a time instant (namely, present time instant involving date except for "minute and second") of a mother country of this user on a screen of the display device (step SA1), and then stores the time instant entered by manipulating a predetermined key into the work area 10a (see FIG. 5) of the DRAM 10 as a mother-country time instant 61 (step SA2). Thereafter, while all of the proposed languages previously stored in the above-described proposed language setting table "T1" are displayed on the screen of the display device 6, the DSP/CPU 3 of the first digital camera 1 prompts the user to select such a language as a main language (namely, mother tongue of this user) (step SA3), and then, sets any of the selected languages as the main language, namely as a first language in the present invention. In other words, a main language flag is set to the selected language in the language selecting flag storage area 11b (FIG. 3) which has been previously secured in the built-in flash memory 11 (step SA4).

Next, the DSP/CPU 3 requests the user to enter a time instant of a region (travel destination etc.) where this first digital camera 1 is used (step SA5). It should also be noted that the requested time instant in this step SA5 is also a present time instant including a date except for "minute and second" similar to the above-described step SA1. Then, the entered time instant is stored as a local time instant 62 into the work area 10a (see FIG. 5) of the DRAM 10 (step SA6) Subsequently, the DSP/CPU 3 calculates a time difference between the mother-country time instant and the local time instant, and retrieves such a proposed language which corresponds to the calculated time difference from the proposed language setting table T1 shown in FIG. 2A (step SA7). Then, the DSP/CPU 3 displays the retrieved proposed languages (either one or plural languages) on the screen of the display device 6 so as to prompt the user to select a language used in the camera-used area from the retrieved proposed languages (step SA8). For instance, in such a case that the above-described mother-country time instant corresponds to "Apr. 30, 2002, 10 A.M."; the main language corresponds to "Japanese"; and the local time instant corresponds to "Apr. 30, 2002, 2 A.M.", the above-described time difference becomes "−8 hours" and the camera-used area corresponds to "Amsterdam, We in, Berlin, Stockholm, - - - ." As a result, "Dutch, German, Swedish, - - - ," are displayed on the screen of the display device 6 as the proposed language Then, any one of the languages, which is selected by the user, is set as the sub-language, namely, the second language in the present invention (step SA9). In other words, the DSP/CPU 3 sets a sub-language flag to the selected language in the above-explained language selecting flag storage area 11b (see FIG. 3) of the built-in flash memory 11 (step SA10), and then this process operation is accomplished.

In accordance with this embodiment, when the DSP/CPU 3 prompts the user to select the sub-language (second language), as previously explained, the selectable proposed languages are specified based upon the time difference between the mother-country time instant 61 and the local time instant 62, so that the selectable possibility as to this sub-language may be minimized. As a result, the user can easily perform the setting operation of the sub-language. Alternatively, the first digital camera 1 may be arranged by that the user may directly designates (selects) the sub-language in this alternative case, for example, in a process step just before the process step SA5, the DSP/CPU 3 causes the user to previously select as to whether or not the sub-language is directly designated. When the user directly designates the sub-language, similar to the above-described step SA2, the DSP/CPU 3 may request the user to designate a predetermined language from all of the proposed languages stored in the proposed language setting table T1, and then may set this designated language as the sub-language.

Camera Operation in Foreign Travel Mode

Figure 6:
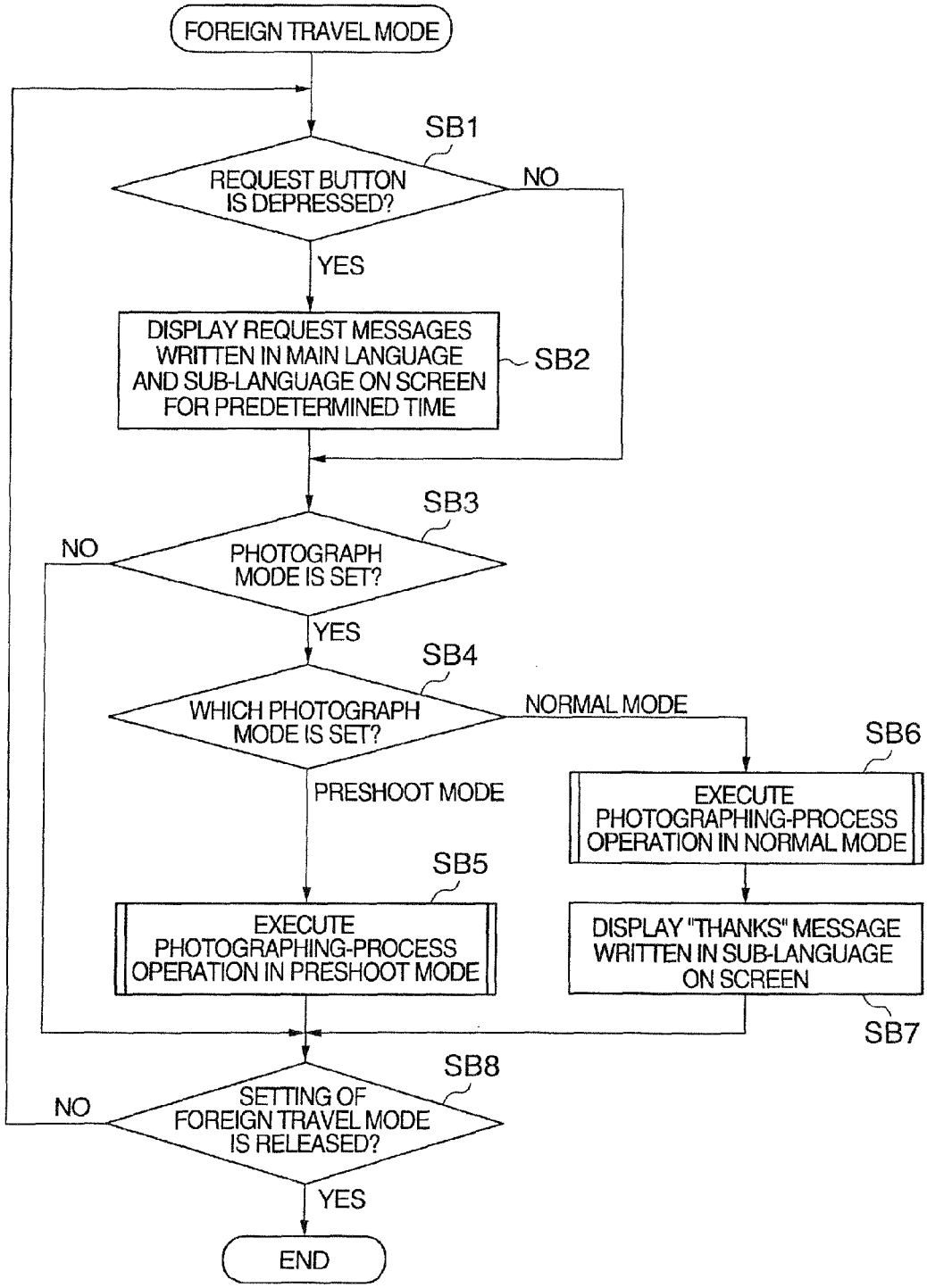
FIG. 6 is a flow chart for describing sequential operations of the first digital camera while a foreign travel mode is set.

Next, a description is made of sequential operations when a foreign travel mode is set by a user in the first digital camera 1 with reference to a flow chart of FIG. 6. In this operation mode, it is so assumed that "Japanese" has been set as the main language (first language) and also "English" has been set as the sub-language (second language) in the above-described foreign travel mode. In other words, it is so assumed that both the main language flag and the sub-language flag have been set to such a condition shown in FIG. 3 in the above-explained language selecting flag storage area 11b of the built-in flash memory 11.

Figure 7:
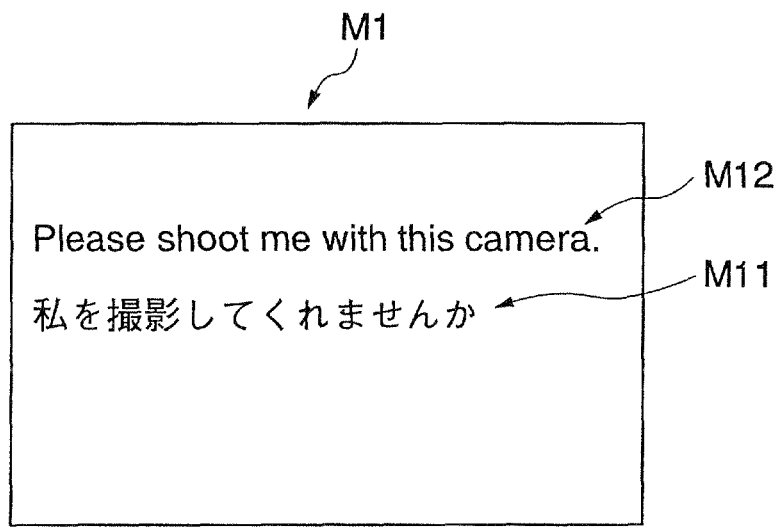
FIG. 7 is a diagram for showing a display example of a request message in the digital camera.

When the foreign travel mode is set by the user in the first digital camera 1, the DSP/CPU 3 firstly judges as to whether or not a request button is depressed by the user (step SB1). This request button has been allocated to any one of the keys employed in the key input unit 7. When the request button is depressed by the user ("YES" in step SB1), the DSP/CPU 3 reads out from the built-in flash memory 11, both the character string data of the main language (Japanese) and the character string data of the sub-language (English), which correspond to predetermined numbers. Then, DSP/CPU 3 displays these character string data as request message "M1" for requesting photographing operation on the display device 6 only for a predetermined time period (for example, only 5 seconds), as represented in FIG. 7 (step SB2).

As a result, for instance, if a user who is very weak in English previously sets "English" as the sub-language in the above-described language environment setting mode before this user travels to the English-language speaking region, or after the user arrives at the travel destination, then this user may simply request any persons who live in the local area to take pictures in which this user is photographed in this local area. That is, when this user who is very weak in English wants to request someone to take photographs where this user appears in the travel destination, the user depresses the request button so as to show the request message "M1" (displayed by both main language "M11" and sub-language "M12" on screen) to any person in the local area, so that this user can simply request this person to photograph the own picture in this local area. Moreover, since this request message M1 is displayed also in the main language (namely, Japanese in this example), the user can confirm the content of this displayed request message "M1", and therefore, can show this request message "M1" to the third party, which having a sense of security.

Also, in the first digital camera 1, after the request message M1 has been displayed for a predetermined time period, or when the request button is not depressed, ("NO" in step SB1), the DSP/CPU 3 immediately judges as to whether or not any one mode of the photograph modes has been set (otherwise, was set) by the user (step SB3). It should also be assumed that in this embodiment, the first digital camera 1 is equipped with two sorts of photograph modes, namely both the normal mode and the preshoot mode. In this case, if the photograph mode is not set ("NO" in step SB3) and setting of the foreign travel mode is not released, then the process operation is returned to the previous step SB1 ("NO" in step SB8) To the contrary, if setting of the foreign travel mode is not released ("YES" in step SB8), then the process operation defined in the foreign travel mode is accomplished at this time.

On the other hand, when the judgement result of the above-explained step SB3 is "YES" and any one mode of the photograph modes has been set, the DSP/CPU 3 further judges the sort of this set photograph mode (step SB4). Then, when the preshoot mode has been set, the process operation is advanced to a photographing-process operation executed in the preshoot mode in a step SB5 (will be explained later). Also, when the photograph mode has been set, the DSP/CPU 3 executes the normal photographing-process operation (step SB6). That is, an image of a subject for photography is photographed by the CCD 2 in response to the depression of the shutter key to produce image data, and then, this image data is compressed so as to be recorded on the memory card 13. Thereafter, the DSP/CPU 3 reads English (sub-language) character string data corresponding to a predetermined number from the above-explained document table T2 (FIG. 2B), and then, displays this English character string data as the thanks message M3 (see FIG. 11B) on the screen of the display device 6 (step SB7). Then, until setting of the foreign travel mode is released ("NO" in step SB8), the above-described process operation is repeatedly carried out.

Photographing-process Operation in Preshoot Mode

Next, contents of photographing-process operation executed in the preshoot mode in the above-explained step SB5 will now be explained with reference to a flow chart shown in FIG. 8. The preshoot mode corresponds to such a photograph mode which is set to, for example, commemorative photographing operation, and member-gathered photographing operation. This preshoot mode will now be summarized. That is, in this preshoot mode, after a provisional photographing operation for photographing an image used to determine a picture composition has been once carried out by a user, the user perform an actual photographing operation capable of actually record an image.

As shown in the flowchart of FIG. 8, in the first digital camera 1 operated in the preshoot mode, the DSP/CPU 3 causes the CCD 2 to sequentially perform photographing operations as to images of subjects for photographing until the shutter button is depressed in a half travel distance ("NO" in step SC1), and then, to temporarily store image data of the photographed subjects and also to display through images on the display screen of the display device 6 in a similar manner to the photograph waiting operation in the normal photograph mode. At a time instant when the shutter button is just depressed in the half travel distance ("YES" in step SC1), the DSP/CPU 3 executes both the AF process operation and the AE process operation to set a position (AF position) of the focusing lens and also to set various control values (AE values) such as a shutter speed and again of the gain control amplifier (AGC), and then, holds these set photographing condition. In other words, the DSP/CPU 3 executes a so-called "AF/AE locking operation" (step SC2). Also, when the half-distance depressing condition of the shutter button is released before this shutter button is depressed in a full travel distance ("YES" in step SC3, or "NO" in both steps SC3 and SC4), the process operation is returned to the previous step SC1 in which the DSP/CPU 3 restarts both the AF processing operation and the AE processing operation.

Figure 9A:
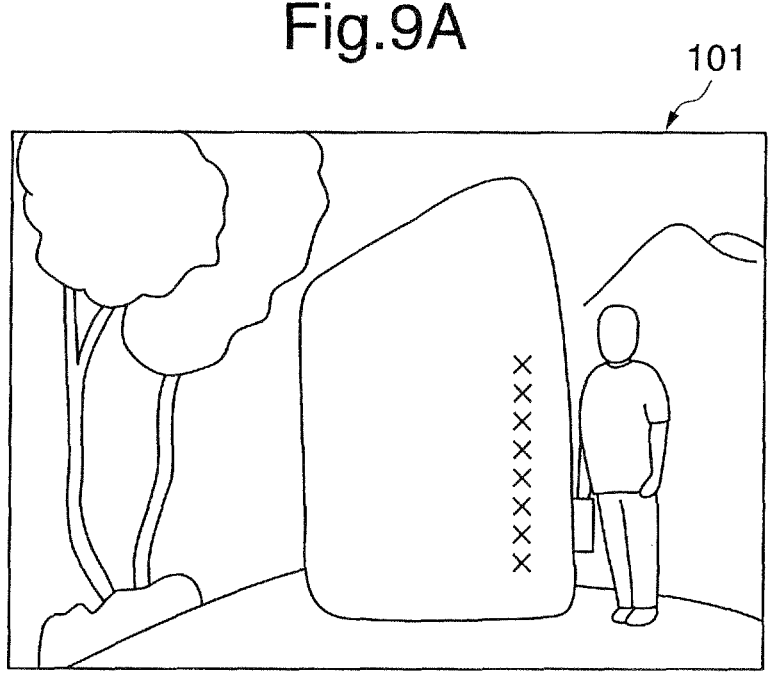
FIG. 9A is a pictorial diagram for indicating a through image displayed on a display device of the first digital camera just before a provisional photographing operation.

While the above-explained normal photographing operation is carried out, and the user observes such a through image 101 as illustrated in FIG. 9A, this user supposes a place where the user himself is located within the viewing frame, and thus, determines a desirable picture composition based upon this supposition. Thereafter, this user depresses the shutter button of the first digital camera 1 after such a desirable picture composition has been determined. On the other hand, in the first digital camera 1, when the shutter button is depressed in the full travel distance by the user, namely when the provisional photographing operation is carried out ("YES" in step SC4), the DSP/CPU 3 executes the provisional photographing operation, and directly and temporarily stores such an image data which has been photographed at this time instant and has been displayed as the through image 101 into a predetermined storage area (buffer) of the DRAM 10 as reference image data for making up a picture composition (step SC5).

Figure 9B:
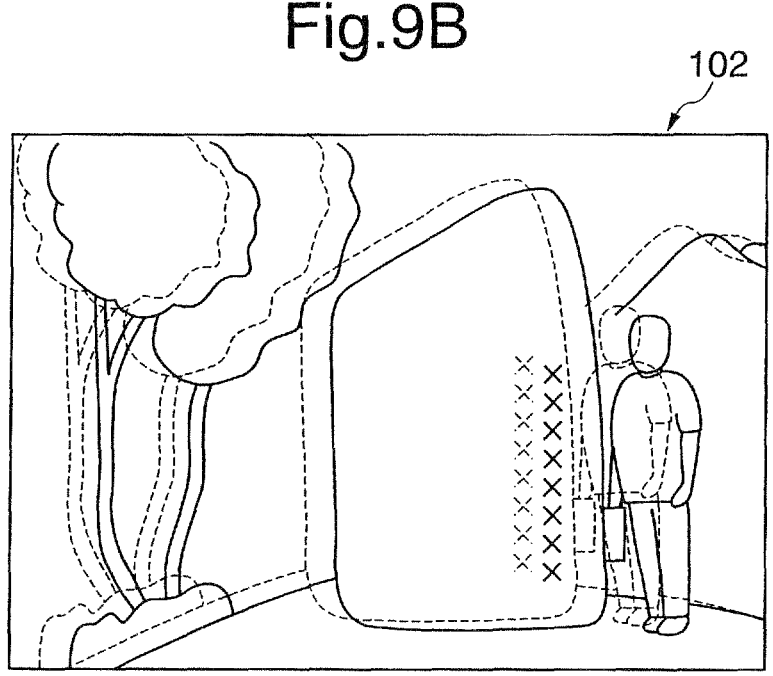
FIG. 9B is a pictorial diagram for representing a synthesized image displayed on the display device just after the provisional photographing operation.
Figure 10A:
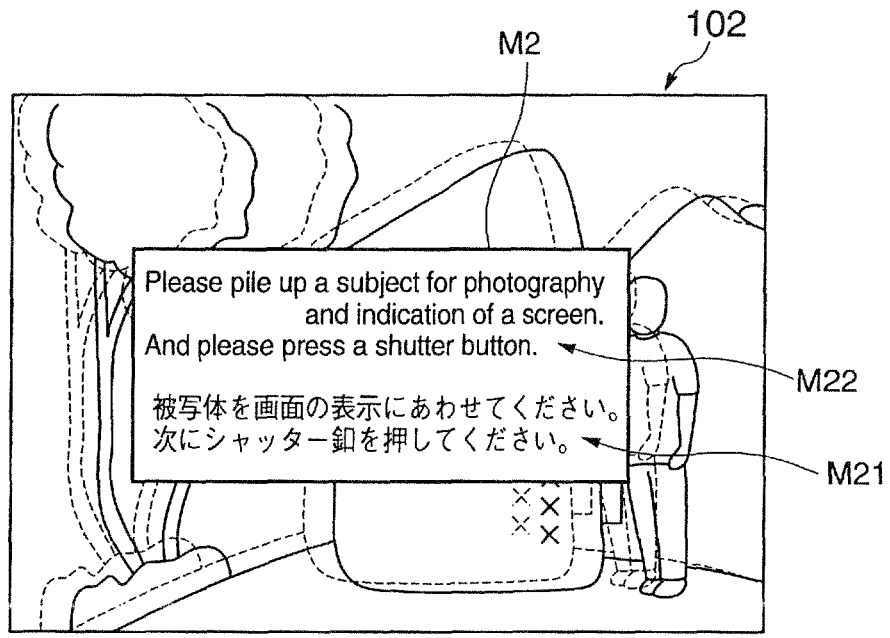
FIG. 10A is a pictorial diagram for showing a display mode of a photograph instruction message in the first digital camera.

Subsequently, in the first digital camera 1, the DSP/CPU 3 synthesizes image data of a newly-photographed through image with the reference image data recorded in the previous step SC5 to produce a synthesized image 102 (see FIG. 9B), and then displays this synthesized image 102 on the screen of the display device 6 (step SC6). It should also be noted that in this embodiment, when the reference image (namely, through image acquired at such a time instant when shutter button is depressed in full travel distance) is synthesized with a through image, the display degree of the reference image is reduced lower than that of the through image in such a manner that this reference image becomes semi-transparent. To the contrary, when the shutter button is not depressed in the half travel distance ("NO" in step SC7), the DSP/CPU 3 reads from the built-in flash memory 11, both the Japanese character string data and the English character string data corresponding to a predetermined number in the above-explained document table T2 (FIG. 2B). Then, the DSP/CPU 3 displays these read character string data on the screen in an OSD (On-Screen Display) manner (see FIG. 10A), on which the above-described synthesized image 102 has been displayed, as a photograph guide M2 containing both a sub-language "M22" and a main language "M21", which may explain, or guide operation manual of this actual photographing operation (step SC8).

As a consequence, after the user has performed the provisional photographing operation, this user can teach the operation manual of the actual photographing operation after this provisional photographing operation to a third party who is required to perform this actual photographing operation by showing this third party the screen of the display device 6 on which the photograph guide M2 is displayed.

Figure 10B:
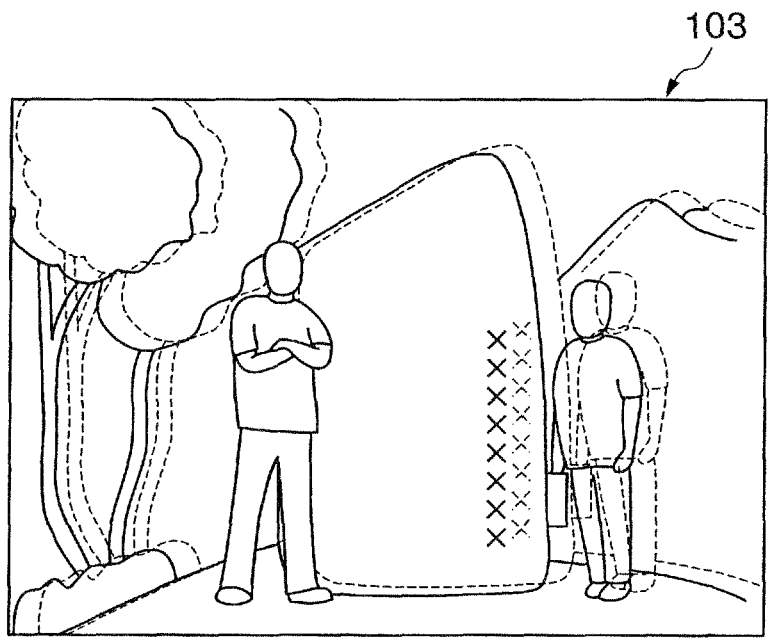
FIG. 10B is a pictorial diagram for indicating a synthesized image displayed on the display device while an actual photographing operation is performed.

Thereafter, in this first digital camera 1, the DSP/CPU 3 continuously displays the photograph guide M2 until the shutter button is depressed in the half travel distance, while sequentially updating/displaying such a synthesized image. That is, this synthesized image is obtained by synthesizing the reference image whose display position is fixed, namely the through image 101 acquired at the time instant when the provisional photographing operation has been carried out, with such a present through image where the above-described user of this first digital camera 1 moved to a predetermined place is photographed. Also, when the shutter button is depressed in the half travel distance ("YES" in step SC10), at this time, the photograph guide M2 displayed in the OSD-display manner as shown in FIG. 10B is deleted (step SC9) When the half-depression state of the shutter button is released ("YES" in step SC10), the DSP/CPU 3 executes the process operations defined from the step SC6 to the step SC8 so as to again display the photograph guide M2. It should be noted that when the above-explained synthesized image 102 is firstly displayed in the step SC6 just after, for example, the provisional photographing operation has been completed, this photograph guide M2 may be alternatively displayed only for a predetermined time duration.

Figure 11A:
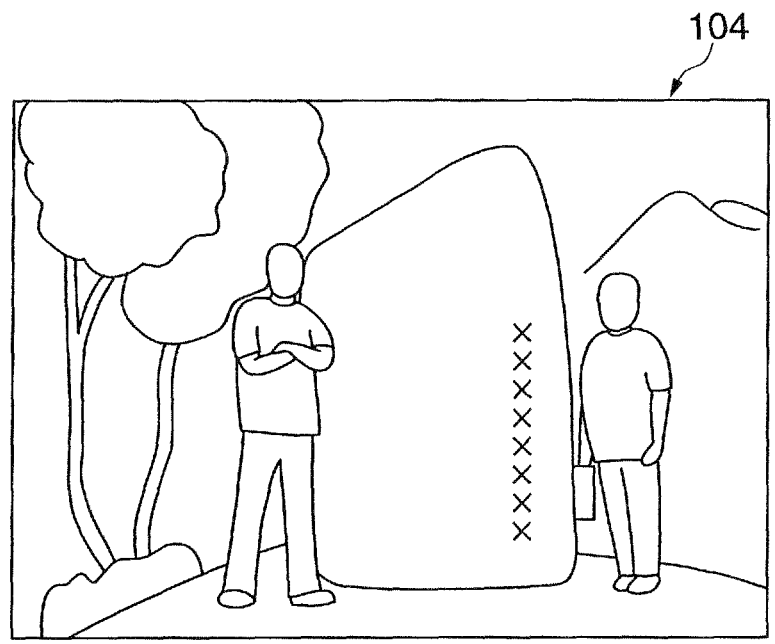
FIG. 11A is a pictorial diagram for showing a photographic image recorded during the actual photographing operation.

Then, before the third party who is requested to take the picture depresses the shutter button in the full travel distance by determining the picture composition in such a manner that both the images are made coincident with each other in accordance with the above-explained photograph mode M2 ("NO" in step SC11), the DSP/CPU 3 repeatedly carries out the process operations defined from the step SC6 to the step SC10. When the shutter button is depressed in the full travel distance ("YES" in step SC11), the DSP/CPU3 performs an actual photographing operation under both the AF position and the AE values (photographing conditions), which have been set/held in the step SC2 while the provisional photographing operation is performed, and thus, records such a photographed image 104 as shown in FIG. 11A. That is, an image of the subject for photography at this time instant is acquired by the CCD 2, and further, the acquired image data is overwritten into the image data of the reference image which has been temporarily stored in the predetermined storage area of the DRAM 10 during the provisional photographing operation defined in the step SC5, and then, the overwritten image data is compressed to obtain the compressed image data which will be stored in the memory card 13 under control of the DSP/CPU 3 (step SC12) As a result, such a photograph (image) on which the user himself of this first digital camera 1 has been imaged can be recorded on the memory card 13 with the substantially same picture composition as such a picture composition which was supposed by the user during the provisional photographing operation.

Figure 11B:
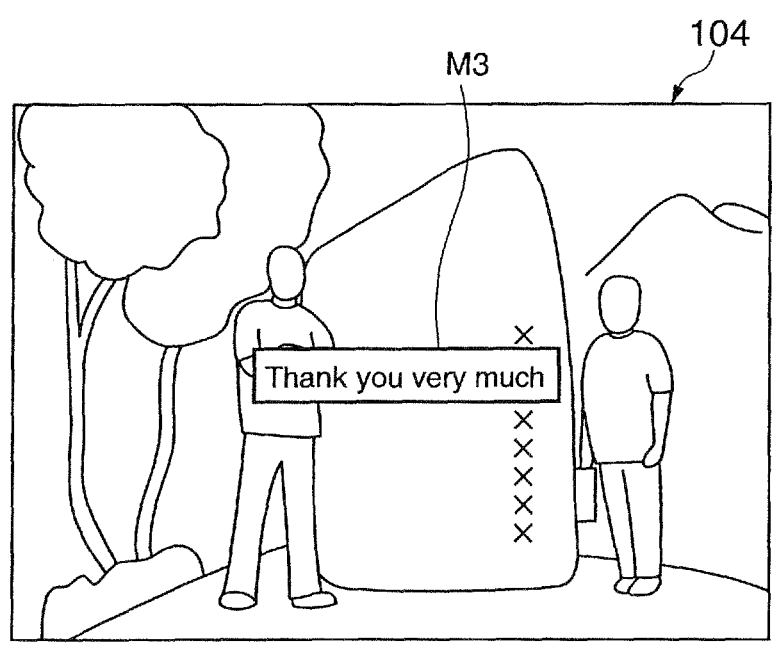
FIG. 11B is a pictorial diagram for showing a display mode of a thanks message made just after the actual photographing operation is carried out.

Thereafter, at this stage, the DSP/CPU 3 immediately reproduces the photographed image 104 to be displayed on the screen of the display device 6, and reads out the character string data in English (sub-language) corresponding to a predetermined number in the above-described document table "T2 (see FIG. 2B)" from the built-in flash memory 11, and then displays such an English character string data on this display screen in the OSD-display manner as represented in FIG. 11B as the thanks message M3 written in the sub-language (English) (step SC13). It should also be noted that both the reproducing operation of the photographed image 104 and the displaying operation of the thanks message M3 are automatically accomplished after a preselected time period (e.g., several seconds) has passed. Then, the photographing-process operation in the preshoot mode is accomplished.

As a result, even in such a case that the user wants the photographing operation in the photograph mode which is similar to the above-described preshoot mode and is different from the normal photograph mode (namely, specific photographing sequence is required), after the user has carried out the provisional photographing operation, the user can correctly and simply inform the sequential operation of the actual photographing operation in such a manner that the screen of the display device 6 on which the photograph guide M2 has been displayed is represented to the third party who is required to take the picture. Also, after the actual photographing operation has been completed, the user can inform his thanks to this third party by showing the thanks message M3 expressed in the second language. This thanks expression made by the user is similarly realized in the case that the user requests the third party to perform the photographing operation in the normal mode. Further, since the photograph guide M2 is displayed not only in English (sub-language), but also in Japanese (main language), the user can confirm the contents of the displayed sequential operation with having a sense of security. It should also be noted that the thanks message M3 may be similarly displayed not only in English (sub-language), but also in Japanese (main language).

Arrangement of Second Digital Camera

FIG. 12 is a block diagram for schematically showing an electronic arrangement of a digital camera 201 according to a second embodiment of the present invention.

This second digital camera 201 is equipped with a GPS module 202 in addition to the electronic arrangement of the first digital camera 1 shown in FIG. 1, which constitutes a structural different point thereof. The GPS module 202 corresponds to a positional information acquiring means of the present invention, which has a function capable of measuring a present position by way of the GPS (global positioning system) system. Although not shown in this drawing, the GPS module 202 contains a GPS antenna, a control circuit, a memory, a time counting circuit, and the like. The GPS antenna receives GPS electromagnetic waves transmitted from the GPS satellites. The control circuit demodulates/decodes position-measuring information (namely, C/A code of L1 band) which is contained in the GPS electromagnetic waves received by the GPS antenna so as to analyze latitude/longitude of a present position, and then supplies the analyzed latitude/longitude information to the DSP/CPU 3. The memory stores therein to such data related to the position-measuring system which is required to analyze the latitude/longitude. The time counting circuit counts a time instant of a local area in high precision in order to determine reception timing of GPS electromagnetic waves transmitted from the GPS satellite. This time counting circuit also counts year/month/day information.

Figure 13:
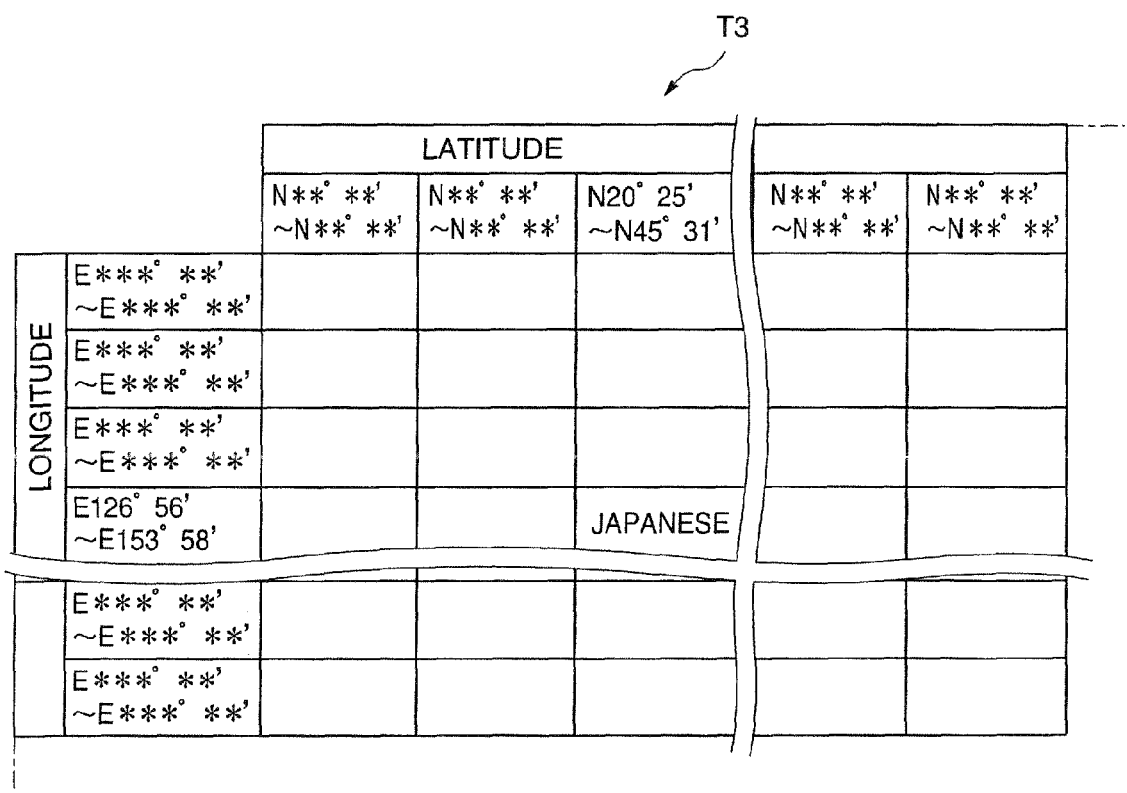
FIG. 13 schematically indicates a position/language setting table constituted by storage data of a flash memory built in the second digital camera of FIG. 12.

In addition to the data which constitute both the proposed language setting table "T1" and the document table "T2" shown in FIG. 2, another data which constitutes a position/language table "T3" indicated in FIG. 13. This position/language table "T3" corresponds to such a table which indicates that what languages are used in arbitrary regions on the earth, which are specified based upon latitude and longitude. As to latitude and longitude, predetermined ranges are set to such degrees by which such regions where respective languages are used may be specified. It should be understood that the languages which can be recognized based upon this position/language table "T3" need not cover all of the languages which are being used in the world similar to the above-described proposed language setting table "T1". For instance, this position/language table "T3" may cover such languages which are suspected to be used in normal travel destinations, and also may cover only official languages used in the respective countries and the respective regions. Since structural units other than the above-explained structural units employed in the second digital camera 201 are similar to those employed in the digital camera 1 of the first embodiment, the same reference numerals will be employed as those for denoting them, and therefore, explanations thereof are omitted.

Camera Operation of Second Digital Camera 201

Figure 14:
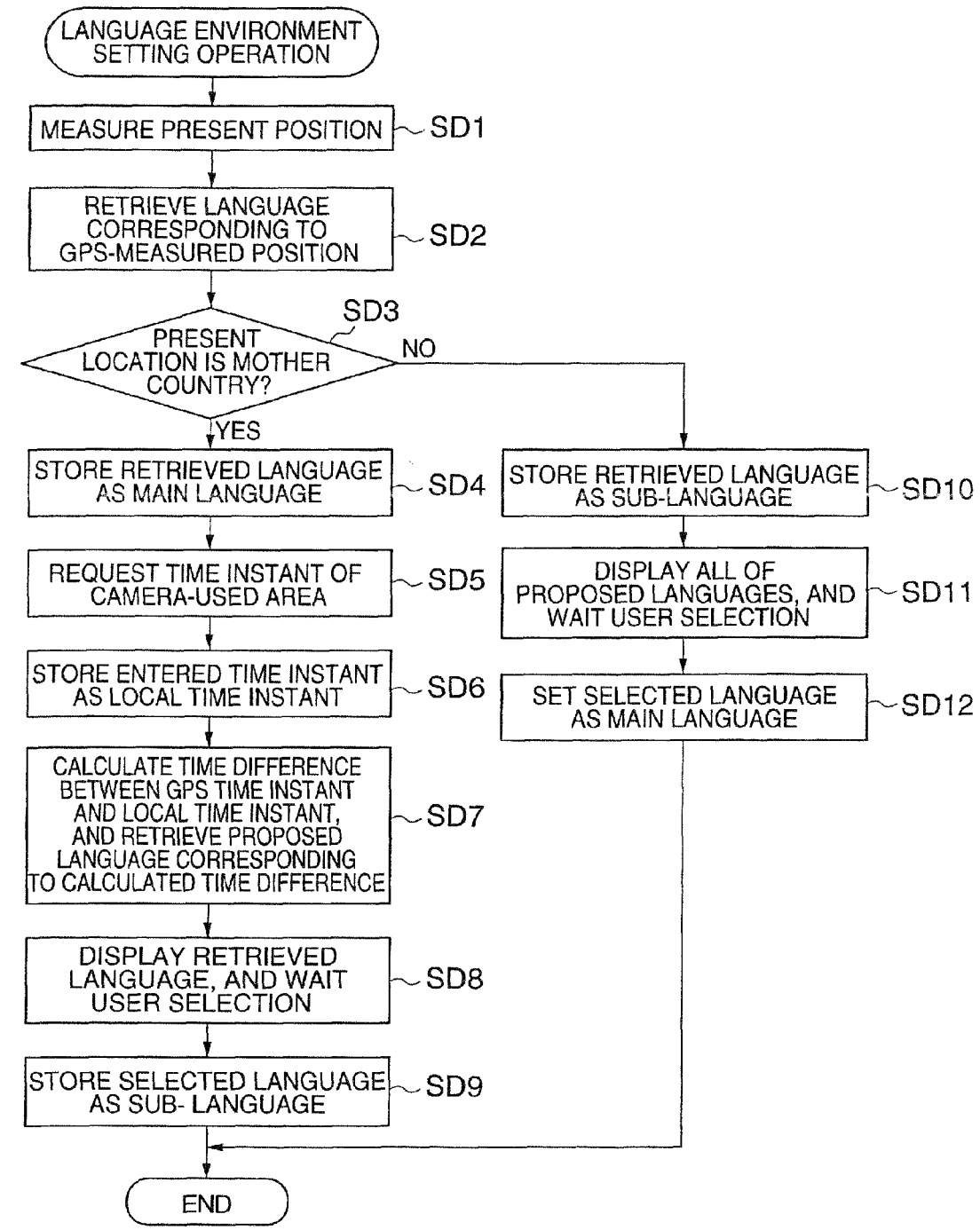
FIG. 14 is a flow chart for describing sequential operations of the second digital camera of FIG. 12 executed in a language environment setting mode.

Next, a description will now be made of operations of the second digital camera 201 according to the second embodiment. FIG. 14 is a flowchart for describing sequential operations of the second digital camera 201 in such a case that a language environment setting mode is selected by a user, and this language environment setting mode is used to set various sorts of data required in a foreign travel mode.

When this language environment setting mode is set, the second digital camera 201 is operated as follows. That is, the GPS module 202 measures a present position of this second digital camera 201 (step SD1), and thus, the DSP/CPU 3 retrieves a language corresponding to the present position measured by this GPS module 202 from the above-described position/language table "T3" (step SD2). Next, the DSP/CPU 3 requests the user to confirm as to whether the present location corresponds to a mother country, or a travel destination. When the present location corresponds to the mother country ("YES" in step SD3), the DSP/CPU 3 sets the language retrieved in the step SD2 as the main language. In other words, the DSP/CPU 3 sets a main language flag to the selected language in the language selecting flag storage region 11b (FIG. 3) which has been previously secured in the built-in flash memory 11 (step SD4). As a result, the main language is automatically set.

Next, the DSP/CPU 3 prompts the user to enter a time instant of a used area (travel destination etc.) of this second digital camera 201 (step SD5). This time instant corresponds to such a present time instant including date except for "minute and second." Then, the DSP/CPU3 stores the time instant which has been entered by manipulating a predetermined key into the work area of the DRAM 10 as a local time instant 62 (step SD6). Subsequently, the DSP/CPU 3 calculates a time difference between the local time instant 62 entered by the user and a time instant (present time instant containing date except for "minute and second") which is indicated by the timer of the GPS module 202, namely a present time instant of the mother country. Also, the DSP/CPU 3 retrieves such a proposed language corresponding to this calculated time difference from the proposed language setting table "T1" shown in FIG. 2A (step SD7). Then, the DSP/CPU 3 displays either one or plural proposed languages, which are retrieved, and then prompts the user to select such a language which is used in the camera-used area (step SD8). In other words, different from the above-explained first embodiment, the DSP/CPU 3 of the second digital camera

201 can specify the camera-used area without requesting the user to enter a time instant of the camera-used area (travel destination) of this second digital camera 201, and then requests the user to select the language used in this camera-used area. Then, the DSP/CPU 3 sets any one of the languages selected by the user as the sub-language. In other words, the DSP/CPU 3 sets a sub-language flag to the selected language in the language selecting flag storage region 11b of the built-in flash memory 11 (step SD9), and then the process operation is accomplished.

On the other hand, when the judgement result of the above-described step SD3 is "NO" and the present location is a travel destination, the DSP/CPU 3 sets the language retrieved in the step SD2 as a main language (step SD10). As a result, the main language can be automatically set. Thereafter, the DSP/CPU 3 displays all of the proposed languages on the screen of the display device 6, which have been stored in the proposed language setting table T1, and then requests the user to select such a language (mother tongue of user) which constitutes the main language (step SD11), and also, sets any one of the selected languages as the main language (step SD12). The process operation is accomplished.

As previously described, in this second embodiment, when both the main language (first language) and the sub-language (second language) are set in the language environmental setting mode, in such a case that the user sets these first/second languages before this user departs for the foreign travel, the main language can be automatically set, and moreover the sub-language can be readily set. Also, in such a case that the user sets both the first and second languages at the travel destinations, the sub-language can be automatically set. As a consequence, the setting operations required prior to the use of the foreign travel mode can be easily carried out.

In the above-described second embodiment, as previously explained, the digital camera has been so arranged that either the main language or the sub-language are continuously set in the automatic manner. Alternatively, this digital camera may be arranged in such a manner that the user may directly designate (select) these main language and sub-language. In this alternative case, the process operation may be modified as follows. For instance, just before the above-described steps SD4 and SD10, the DSP/CPU 3 requests the user to previously select as to whether or not the sub-language is directly designated. When the user directly designates the sub-language, the DSP/CPU 3 requests the user to designate a predetermined language from all of the proposed languages which have been stored in the proposed language setting table "T1". In the steps SD4 and SD10, the DSP/CPU 3 sets this designated language as either the main language or the sub-language. Also, when a position-measuring operation is carried out by the GPS system, it is necessarily required to previously set position-measuring systems which are different from each other, depending upon countries and regions. As a consequence, instead of the data which constitute the above-described position/language table "T3", while such data are previously stored which constitute another table indicative of a relationship between the respective position-measuring systems and the languages used in the regions where these position-measuring systems are employed, the DSP/CPU 3 alternatively may request the user to select either a main language or a sub-language from the languages corresponding to the position-measuring systems which have been set at the respective time points. Furthermore, positional information indicative of a local area may be acquired by utilizing another method irrespective of the position-measuring method based upon the GPS system.

Other Digital Cameras

On the other hand, in the above-described first and second embodiments, since the display device 6 for displaying the photographed images is employed so as to function as the output means of the present invention, such messages as the request message M1, the photograph guide M2, and the thanks message M3 are outputted in the form of the character information. The present invention is not limited only to these embodiments. For example, as the output means, a digital camera may be arranged in such a manner that a speech synthesizing circuit capable of producing the above-described messages in a speech synthesizing manner, and a speaker are provided. In this alternative case, speech data is required instead of the character data of the expressions made of the respective proposed languages which correspond to a plurality of these messages. In addition, while both the speech synthesizing circuit and the speaker are provided in the arrangements shown in FIG. 1 and FIG. 12, any one of a main language message and a sub-language message may be displayed on the screen of the display device 6, and further, the other message may be outputted in the speech synthesizing manner at the same time.

Also, for example, such messages having meanings similar to those of the above-explained messages M1 to M3 may be separately and continuously displayed in a preselected sequence based upon the main language and the sub-language. Further, while a plurality of sub-languages may be set, a message may be displayed by using a plurality of sub-languages. Alternatively, such a message made in English may be continuously displayed irrespective of a sub-language. Also, a user may turn ON/OFF a display of a message, or a voice output, if necessary.

Also, in this embodiment, three sorts of thanks messages with respect to the request of the photographing operation, the photographing method in the preshoot mode, and the photographing operation have been displayed, or produced in the speech mode for a predetermined time period. Alternatively, other operations and/or photographing methods adapted to other photographing modes may be prepared as these messages, if required.

What is claimed is:

1. A portable electronic device comprising:
    a main language setting unit for setting a main language corresponding to a mother tongue of a user and a time zone of a region corresponding to the main language;
    a current time zone setting unit for setting a time zone of a region where the portable electronic device is currently located;
    a language specifying unit for specifying at least one proposed language based on a time difference between the time zone of the region corresponding to the main language and the time zone of the region where the portable electronic device is currently located;
    a sub-language setting unit for setting, as a sub-language, a language selected by a user from the at least one proposed language; and
    a message output unit for outputting a message in both the main language and the sub-language when a foreign travel mode is set by the user.

2. The portable electronic device according to claim 1, further comprising:
    a message storage unit for storing a plurality of groups of messages, each of said groups of messages comprising a plurality of messages having a same meaning which are expressed in respective different languages, wherein the message output unit reads from the message storage unit and outputs the message in both the main language and the sub-language when the foreign travel mode is set.

3. The portable electronic device according to claim 1, further comprising:

an image capturing unit, wherein the message output unit outputs, in at least the sub-language, at least one of (i) a message of request to a third party for taking a picture, (ii) a thank you message to the third party for taking the picture, and (iii) operating instructions of the portable electronic device.

* * * * *